US 6,664,682 B2
Dec. 16, 2003

(54) METHOD AND APPARATUS FOR SECURING A CONDUIT BOX TO A MOTOR AND MOTOR INCORPORATING SAME

(75) Inventors: Donald H. Williams, Madison, IN (US); Richard L. Boyd, Underwood, IN (US); W. Alan Ewing, Madison, IN (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/796,167

(22) Filed: Feb. 28, 2001

(65) Prior Publication Data

US 2002/0117919 A1 Aug. 29, 2002

(51) Int. Cl.[7] ................................................. H02K 5/00
(52) U.S. Cl. .............................. 310/89; 310/71; 310/43; 310/45
(58) Field of Search .............................. 310/89, 43, 45, 310/88, 71

(56) References Cited

U.S. PATENT DOCUMENTS

| | | | | | |
|---|---|---|---|---|---|
| 3,518,616 A | * | 6/1970 | Lewis | ........................ | 310/71 |
| 4,101,794 A | * | 7/1978 | Miller et al. | ................... | 310/71 |
| 4,429,243 A | * | 1/1984 | Crow | ........................... | 310/71 |
| 4,851,725 A | * | 7/1989 | Keck | ............................. | 310/71 |
| 5,872,410 A | * | 2/1999 | Sudoff | ....................... | 310/68 R |

* cited by examiner

*Primary Examiner*—Thanh Lam
(74) *Attorney, Agent, or Firm*—Patrick S. Yoder; Alexander M. Gerasimow; William R. Walbrun

(57) ABSTRACT

A technique for securing a conduit box to a housing of an electric motor is disclosed. The technique includes forming a hollow extension from a surface of the conduit box. The conduit box is placed on a motor frame so that the hollow extension is inserted into a hole in the motor frame that passes into the hollow interior of the motor frame. The hollow extension is plastically deformed inside the motor housing to a greater width than the diameter of the hole in the motor housing so that the conduit box cannot be removed from the motor housing. A stator is placed in the motor housing and wiring is routed from the stator to the interior of the wiring box through a passageway formed by the hollow extension.

34 Claims, 6 Drawing Sheets

METHOD AND APPARATUS FOR SECURING A CONDUIT BOX TO A MOTOR AND MOTOR INCORPORATING SAME

BACKGROUND OF THE INVENTION

The present invention relates generally to the field of electric motors and wiring enclosures for housing the electrical connection between an external electrical power cable and internal electrical wiring of an electric motor. More particularly, the invention relates to a novel technique for securing a conduit box to an electric motor.

Electric motors of various types are omnipresent in industrial, commercial and consumer settings. In industry, such motors are employed to power all types of rotating machinery, such as pumps, conveyors, compressors, fans and so forth, to mention only a few. Conventional alternating current electric motors may be constructed for single or multiple phase operation, and are typically specifically designed to operate at predetermined synchronous speeds, such as 3600 rpm, 1800 rpm, 1200 rpm and so on. Such motors generally include a stator, comprising a multiplicity of coils, surrounding a rotor which is supported by bearings for rotation in the motor frame. In the case of AC motors, alternating current power applied to the motor causes the rotor to rotate within the stator at a speed which is a function of the frequency of alternating current input power and of the motor design (i.e., the number of poles defined by the motor windings and rotor resistance). In DC motors power is similarly applied, and the speed of the motor may be controlled in a variety of manners. In both cases, however, a rotor shaft extends through the motor housing and is connected to elements of the machinery driven by the electric motor.

In conventional electric motors, stator winding coils are disposed in parallel slots formed around the inner periphery of a stator core. Certain of the winding coils are electrically connected in groups around the stator core to establish the desired electro-magnetic fields used to induce rotation of the rotor. The number and locations of the windings in the stator core generally depends upon the design of the motor (e.g., the number of poles, the number of stator slots, the number of winding groups, and so forth). Each winding coil includes a number of turns of wire that loop around end or head regions of the stator between the slots in which the winding coil is installed. Following installation in the slots, the coils in each group are generally pressed into a bundle at either end of the stator. The stator windings are connected to electrical wiring that is routed from the stator to a wiring or conduit box located on the outside of the motor through corresponding holes in the motor frame and the conduit box.

The conduit box enables an external power cable to be connected to the electrical wiring coupled to the stator windings without having to access the interior of the motor housing. The conduit box, typically, has a removable cover to enable unimpeded access to the wiring within the conduit box. In general, a conduit box is a housing that is configured to receive a length of electrical conduit housing a power cable. The power cable is routed through a hole in the conduit box into the interior of the conduit box. The conductors of the power cable and the electrical wiring from the motor stator are spliced together and the cable splice is placed in the interior of the conduit box. The cover is then secured to the conduit box and other facets of motor installation may be completed.

While conventional conduit boxes and motor arrangements have been generally satisfactory in may applications, they are not without drawbacks. For example, conduit boxes are typically secured to the motor via screws installed through the box wall and into the motor frame. To provide a seal between the conduit box and motor frame, a grommet is typically placed in the hole between the conduit box and the motor frame to prevent chafing of the wiring passing through the hole. Multiple screws are typically used to secure the conduit box to the motor frame. The resulting structure is relatively complex, includes a number of separate parts, and, in a typical procedure, is assembled by hand. Despite attempts to protect the wiring at the location where it passes through the motor frame and conduit box, damage and even short circuits can occur. Moreover, the cost of the assembly can be considerable as compared to the overall cost of the motor, particularly for smaller or fractional horsepower models.

There is a need, therefore, for an improved technique for securing a conduit box to an electric motor. There is a particular need for a technique that provides a more straight-forward structure from a manufacturing and assembly standpoint and that therefore offers possible cost reductions. The technique should notably provide effective prevention of chafing of the wiring passing through the conduit box, while offering a satisfactory seal between the box and the motor frame.

SUMMARY OF THE INVENTION

The invention provides a novel approach to securing a conduit box to an electric motor designed to respond to these needs. The technique can be employed in various motor configurations, including AC and DC motors, and motors configured with 2, 4, 6 or more poles, for single or multiple phase operation, and from fractional horsepower's to very large power ratings. The technique is based on the plastic deformation of a portion of the conduit box.

In accordance with the first aspect of the technique, a method is provided for manufacturing an electric motor. The method utilizes a novel technique for securing a conduit box to an electric motor. A conduit box is adapted to have a hollow extension. The hollow extension is placed on the motor housing to place the extension through a hole in the motor housing. A tool is pressed against the extension to enlarge the width of the extension so that it is greater than the diameter of the hole in the motor housing, preventing the conduit box from being removed from the hole.

In accordance with another aspect of the technique, an electric motor is provided that has a conduit box secured thereto. The conduit box has a portion that extends through a hole in the motor frame. The portion that extends through the motor frame is plastically deformed to secure the conduit box to the motor frame.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
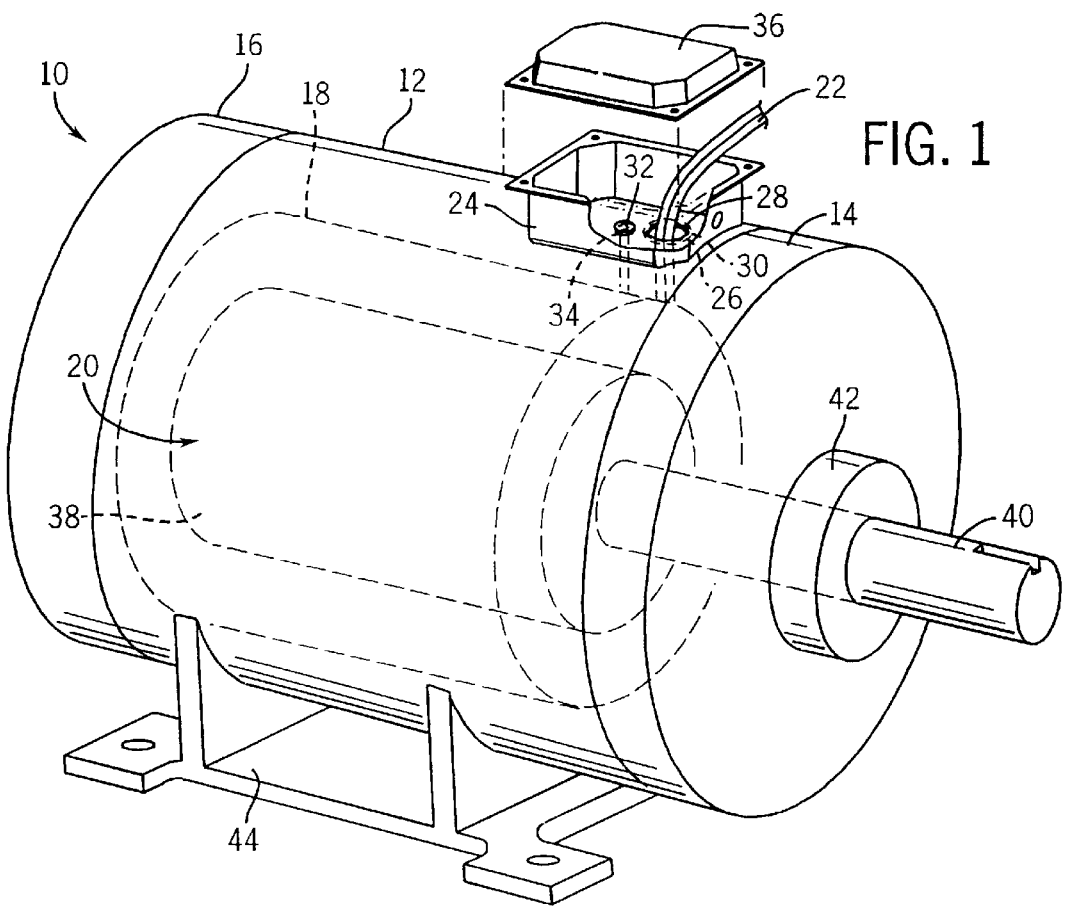
FIG. 1 is a perspective view of an electric motor illustrating the various functional components of the motor including a rotor and a stator, in accordance with certain aspects of the invention.

Turning now to the drawings, and referring first to FIG. 1, an electric motor is shown and designated generally by the reference numeral 10. Motor 10 may be of any suitable type capable of employing an electrical wiring or conduit box to facilitate the electrical coupling of external electrical wiring to the motor's electrical wiring. In the embodiment illustrated in FIG. 1, motor 10 is an induction motor housed in a conventional NEMA enclosure. Accordingly, motor 10 includes a frame 12 open at front and rear ends and capped by a front end cap 14 and a rear end cap 16. The frame 12, front end cap 14, and rear end cap 16 form a protective shell, or housing, for a stator assembly 18 and a rotor assembly 20. Stator windings are electrically interconnected to form groups, and the groups are, in turn, interconnected. The windings are further coupled to terminal leads 22. The terminal leads 22 are used to electrically connect the stator windings to an external power cable (not shown) coupled to a source of electrical power. Energizing the stator windings produces a magnetic field that induces rotation of the rotor assembly 20.

The electrical connection between the terminal leads and the power cable is housed within a conduit box 24. The terminal leads 22 are passed into the conduit box 24 through a hole 26 in the frame 12. A passageway 28 is formed through the hole 26 by a portion 30 of the conduit box 24 that extends through the frame hole 26. The portion 30 of the conduit box 24 that extends through the hole 26 in the frame 12 secures the conduit box 24 to the frame 12.

In this embodiment, a single screw 32 is utilized to assist in securing the conduit box 24 to the frame 12 and to prevent any movement of conduit box 24, such as rotation of the conduit box 24 about the hole 26, or vibration of the conduit box on the motor frame. The screw 32 is threaded through a hole in the conduit box and into a threaded hole 34 in frame 12. The screw 32 also extends to the stator 18 to prevent rotation of stator 18 as the motor 10 is operated, thus obviating the need for a stator anti-rotation pin or member as in conventional motors. In the illustrated embodiment, the conduit box 24 has a movable cover 36. When cover 36 is secured to conduit box 24, the cover 36 and conduit box 24 form a protective environment for the wiring splice formed between the terminal leads 22 and a power cable (not shown) routed to an electrical power source. The cover 36 may be removed to provide access to the interior of the conduit box 28.

In the embodiment illustrated, rotor assembly 20 comprises a cast rotor 38 supported on a rotary shaft 40. As will be appreciated by those skilled in the art, shaft 40 is configured for coupling to a driven machine element (not shown), for transmitting torque to the machine element. Rotor 38 and shaft 40 are supported for rotation within frame 12 by a front bearing set 42 and a rear bearing set (not shown) carried by front end cap 14 and rear end cap 16, respectively. In one embodiment of electric motor 12, a cooling fan is supported for rotation on shaft 38 to promote convective heat transfer through the frame 12. The frame 12 generally includes features permitting it to be mounted in a desired application, such as integral mounting feet 44. As will be appreciated by those skilled in the art, however, a wide variety of rotor configurations may be envisaged in motors that may employ the conduit box mounting techniques outlined herein, including wound rotors of the type shown, permanent magnet rotors, and so forth.

Figure 2:
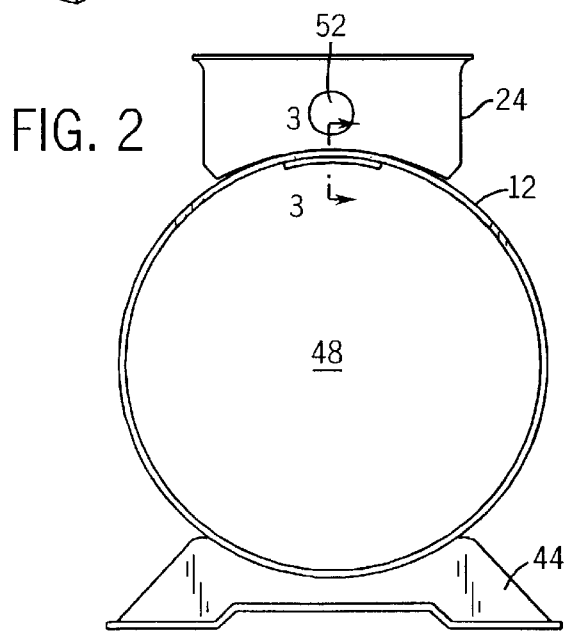
FIG. 2 is an end view of the motor frame and conduit box of FIG. 1.

Referring generally to FIG. 2, the conduit box 24 is preferably formed of a ductile material, such as mild steel, that is adapted to a final desired form after being placed on the frame 12. In the illustrated embodiment, the conduit box 24 is preformed, such as by a punching or drawing operation from a steel blank, and later secured to the frame 12 approximately on the top of the motor 10. However, the conduit box 24 may also be placed on the side or at another location on the motor 10.

Figure 3:
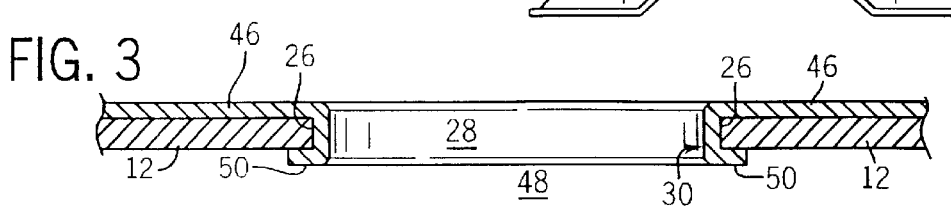
FIG. 3 is a detail view taken along line 2—2 of FIG. 2, illustrating in greater detail the portion of the conduit box that extends through the hole in the frame to secure the conduit box to the frame.

As best illustrated in FIG. 3, the portion 30 of the conduit box 24 that forms the passageway 28 extends from the bottom 46 of the conduit box through the frame hole 26 into the interior 48 of the frame 12. This portion 30 of the conduit box 24 is plastically deformed to form a flange 50. The flange 50 is wider than the hole 26 through the frame 12, preventing the conduit box 24 from being removed from the frame 12. In this embodiment, the flange 50 is generally circular and has a diameter larger than the hole 26 through the frame 12. In addition, the passageway 28 formed by the portion 30 of the conduit box 24 that extends through the hole 26 provides a smooth surface for the terminal leads 22, thereby protecting the terminal leads 22 from rubbing against the sides of the hole 26 in the frame, or the sides of a hole in the conduit box 24, as the terminal leads 22 pass through the frame hole 26 into the conduit box 24. The passageway 28 prevents chafing damage to the terminal leads 22 that could be caused by rubbing against the frame hole 26 or a hole into the conduit box 24. Therefore, no grommet or additional component is needed to prevent chafing of the stator wiring. Referring again to FIG. 2, in this embodiment, the conduit box 24 has a hole, or knockout, 52 to enable a power cable to be inserted into the interior of the conduit box 24 or to enable a conduit having electrical wiring disposed therein to be connected to the conduit box 24.

It should be noted that, in the illustrated embodiment the portion 30 of the conduit box, and the flange 50 formed within the frame are continuous and uninterrupted. That is, as described below, by plastic deformation of the ductile material comprising the conduit box, a continuous flange is provided that secures the box to the motor frame, and offers an effective seal between the box and the motor frame. It has been found that this construction also obviates the need for a separate sealing element between the box and the motor frame as provided in certain prior art arrangements. It should also be noted, however, that where desired, securement of the conduit box via the present techniques may be carries out with a portion 30 that is not continuous, thus forming tabs or fingers extending into the motor frame. Similarly, where desired, a separate element may be deformed in a manner similar to that described for portion 30 so as to form a continuous or intermittent flange within the motor frame, within the conduit box, or both.

Figure 5:
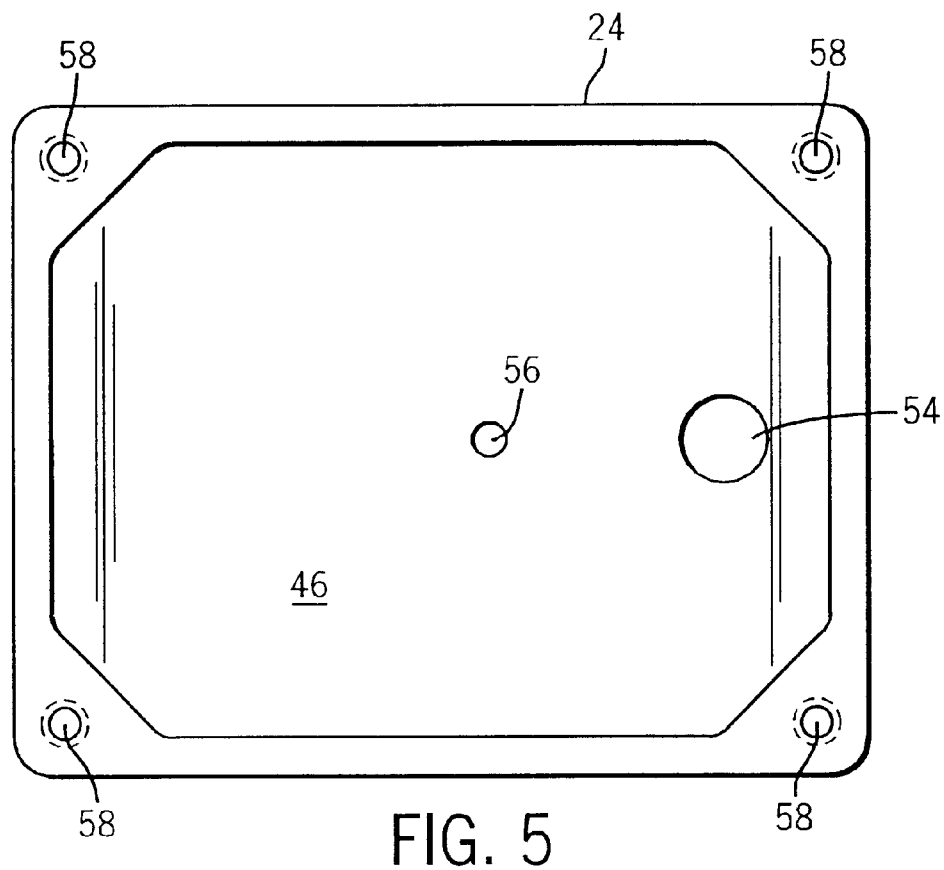
FIG. 5 is a top view of the conduit box of FIG. 4.
Figure 4:
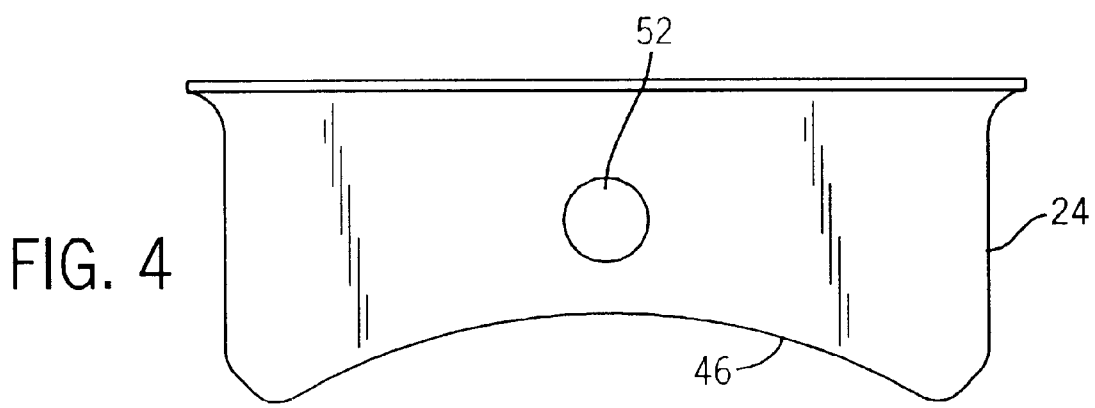
FIG. 4 is an end view of a conduit box.

Referring generally to FIGS. 2 and 4, the bottom surface 46 of conduit box 24 has an arcuate shape adapted to conform to the generally cylindrical shape of the frame 12 in the illustrated embodiment. However, the frame 12 and the conduit box 24 could be configured for engagement in other ways, as well. For example, the motor frame can have a flat portion configured for abutment against a flat bottom of the conduit box. As best illustrated in FIG. 5, the portion 30 of the conduit box 24 that extends through the frame hole 26, initially, does not extend from the bottom of the conduit box 24 but is simply from a region of the bottom 46 of the conduit box 26 surrounding the hole 54 through the bottom 46 of the conduit box 24. Additionally, a screw hole 56 is provided for the single screw 32 to be inserted through the bottom 46 of the conduit box 24. The conduit box 24 also has several threaded holes 58 for attachment of the cover 36 to the conduit box 24. However, the cover 36 may be removeably secured to the conduit box 24 in a number of ways, as well.

Figure 6:
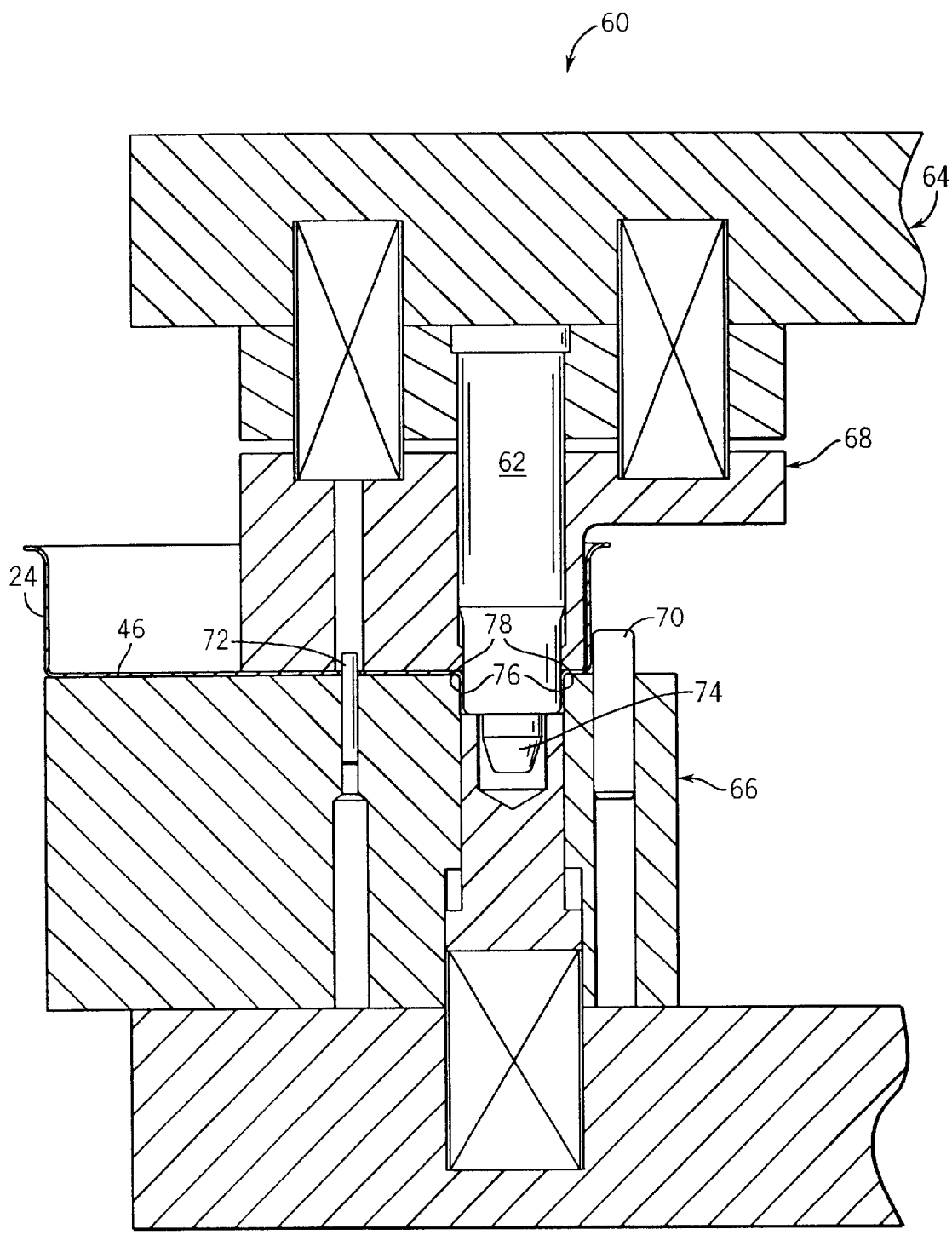
FIG. 6 is a side view of a conduit box and a punch-and-die assembly, illustrating the process of extruding a portion of the conduit box to form a skirt for insertion through a hole in a motor frame.

Referring generally to FIGS. 6–9, an exemplary process of forming the portion 30 of the conduit box 24 that extends through the frame hole 26, and for securing the conduit box 24 to the frame 12 is illustrated. As illustrated in FIG. 6, a punch-and-die assembly 60 is used to coin or extrude a portion of the conduit box surrounding the initial hole 54 in the bottom 46 of the conduit box 24. The punch-and-die assembly 60 comprises a punch 62 driven by a press 64. The illustrated punch-and-die assembly 60 also has a lower die assembly 66 and an upper die assembly 68 to secure the conduit box 24 during the extrusion process. The lower die assembly 66 has a guide 68 abutted against the conduit box 24 and a guide pin 70 inserted through the screw hole 56 in the conduit box 24 to locate the conduit box 24 during the extrusion process.

The punch 62 has a generally conically shaped tip 74 that is inserted into the hole 54 in the bottom 46 of the conduit box 24. The press 64 drives the tip 74 of the punch 62 through the hole 54. The diameter of the base of tip 74 is greater than the diameter of the hole 54 causing the tip 74 to extrude and plastically deform a portion of the conduit box as the punch 62 is driven downward, from this perspective, through the hole 54. The punch 62 has a shoulder portion 76 that has a larger diameter than the tip 74. As the shoulder portion 76 is driven downwardly against the conduit box 24, the shoulder 76 further enlarges the hole and produces a cylindrical skirt 78 descending from the bottom 46 of the conduit box 24.

Figure 7:
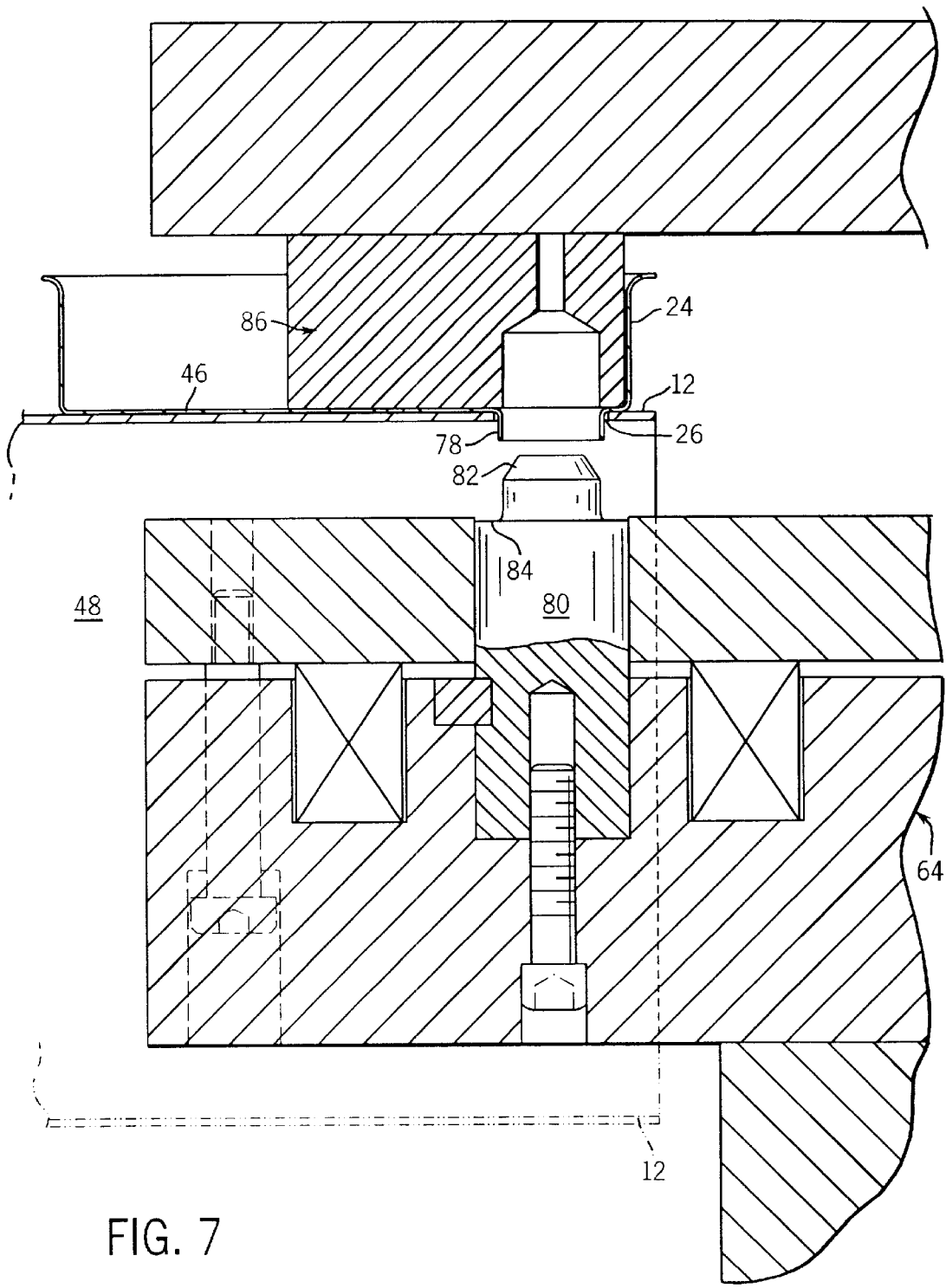
FIGS. 7 and 8 are side views illustrating the process of deforming the conduit box skirt to form a smooth passageway through the conduit box and the motor frame.

Referring generally to FIG. 7, the punch-and die assembly 60 is reconfigured to secure the conduit box 24 to the frame 12. The conduit box 24 is placed on the frame 12 so that the skirt 78 is inserted through the hole 26 in the frame 12. The press 64 is positioned inside the interior 48 of the frame to drive a punch 80 upward against the skirt 78 descending from the bottom 46 of the conduit box 24. The punch 80 has a generally conical shaped tip 82 and a shoulder 84. An upper die assembly 86 is used to hold the conduit box 24 securely against the frame 12 as the punch 80 is driven against the skirt 78.

Figure 8:
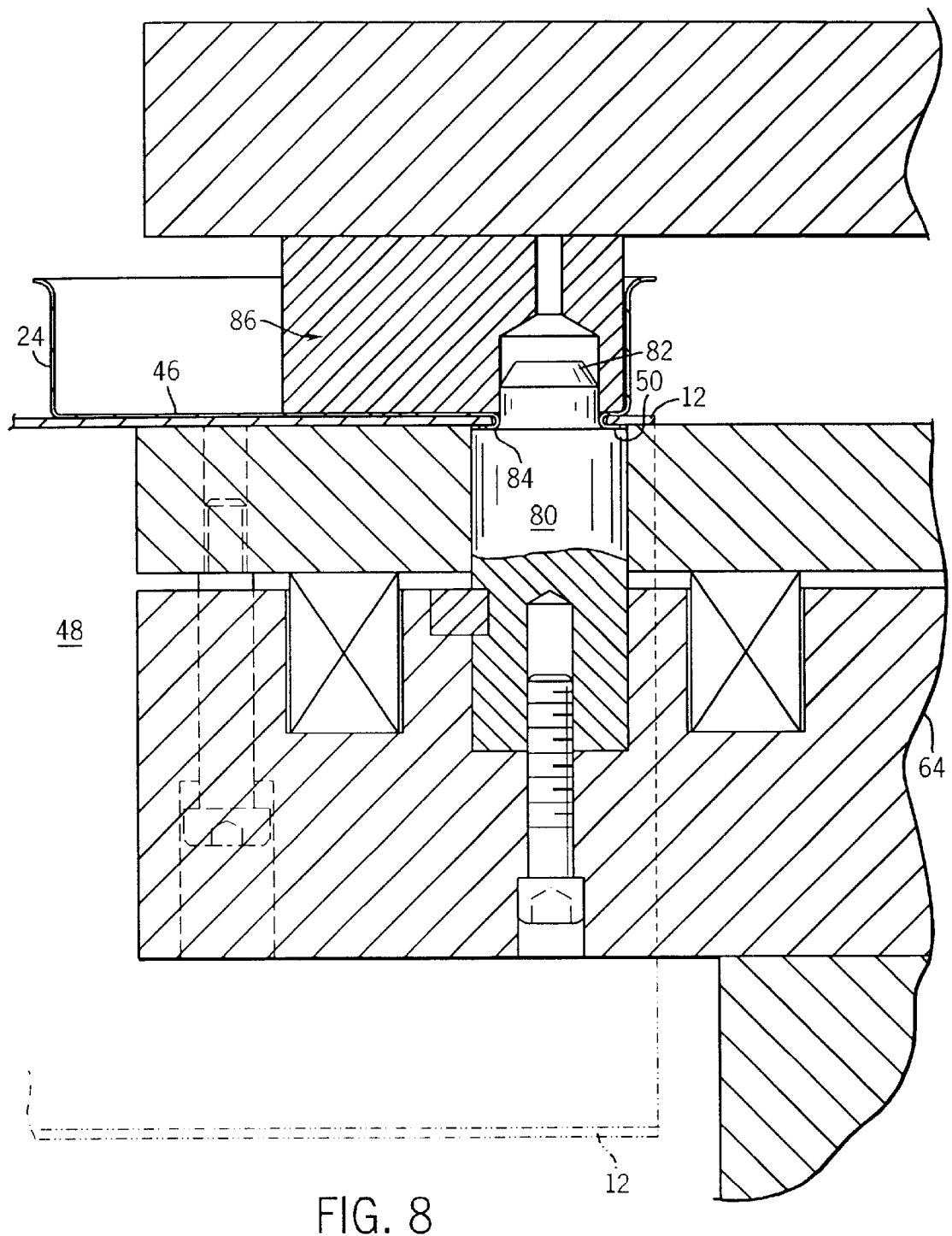
Figure 9:
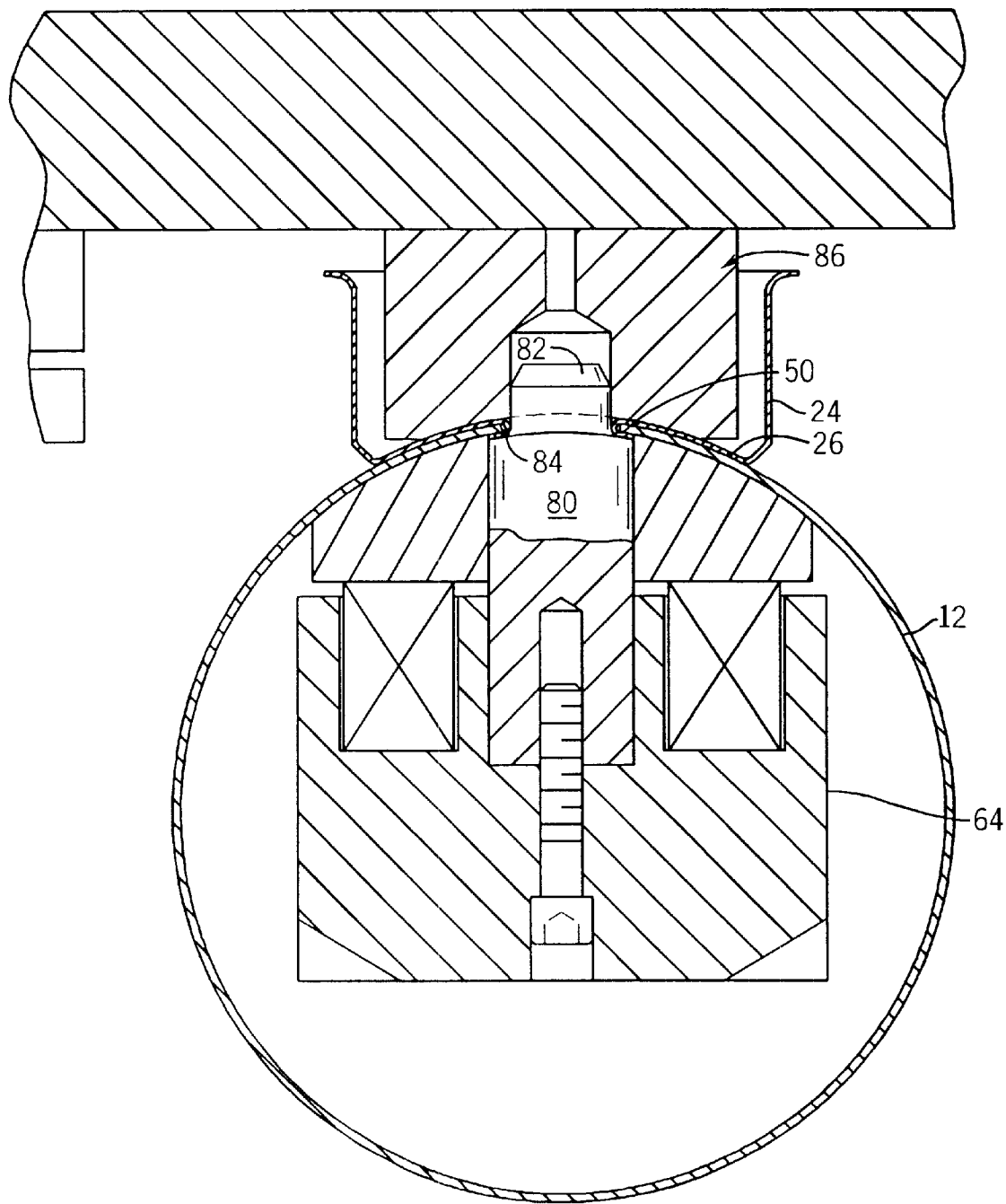
FIG. 9 is an end view illustrating the process of deforming the conduit box skirt to form a smooth passageway through the conduit box and the motor frame.

Referring generally to FIGS. 8 and 9, as the punch 80 is driven against the skirt 78, the skirt is plastically deformed outwardly by the conical tip 82 of the punch 80. The shoulder 84 completes the process by pressing the skirt 78 back toward the bottom 46 of the conduit box 24 to form the flange 50. In the exemplary embodiment, the flange 50 is pressed flush against the frame 12, in an operation that might be referred to as coining. However, the flange 50 may be deformed such that there is space between it and the motor frame 12 yet still function to secure the conduit box 24 to the frame 12 and form a smooth passageway 28 for the terminal leads 22.

In the illustrated embodiment, the initial circular shape of the hole 54 and the shapes of the punches produce a generally circular flange 50 that extends around the hole 26 in the motor frame 12, forming the smooth passageway 28 for the terminal leads 22 to pass from the interior 48 of the motor frame 12 to the conduit box 24. In this embodiment, the flange 50 also serves to secure the conduit box 24 to the motor frame 12. It may be noted that by changing the shape of the hole in the conduit box 24 or the shape of the tips of the punch the shape of the portion of the conduit box that extends through the hole in the frame and the shape of the flange may be modified. Therefore, configurations other than a circular flange 50 may be utilized to serve the desired functions of securing the conduit box 24 to the frame 12 and forming a smooth passageway 28 for the terminal leads 22 to pass through.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electric motor, comprising:
   a motor housing comprising an exterior and a hollow interior, the motor housing having a hole therethrough from the exterior to the hollow interior, and
   a conduit box comprising a portion that extends through the hole in the motor housing into the hollow interior, the portion being permanently plastically deformed to a configuration that blocks the conduit box from being withdrawn from the hole.

2. The electric motor as recited in claim 1, wherein the hole in the motor housing is generally circular and has a first diameter, further wherein the portion of the conduit box has a first portion that is wider than the first diameter of the hole through the motor housing.

3. The electric motor as recited in claim 2, wherein the first portion is pressed against an interior surface of the motor housing.

4. The electric motor as recited in claim 2, wherein the first portion is generally circular and has a second diameter, the second diameter of the first portion being greater than the first diameter of the hole through the motor housing.

5. The electric motor as recited in claim 1, wherein the portion comprises a passageway for wiring to pass between the hollow interior of the motor housing and an interior portion of the conduit box.

6. The electric motor as recited in claim 1, further comprising a threaded member threaded into the motor housing through the conduit box to prevent rotation of the conduit box relative to the motor housing.

7. The electric motor as recited in claim 1, further comprising a stator disposed within the hollow interior of the motor housing, the stator comprising a plurality of stator windings.

8. The electric motor as recited in claim 7, further comprising electrical wiring coupled to the plurality of stator windings and routed through the portion into an interior of the conduit box.

9. The electric motor as recited in claim 7, further comprising a threaded member threaded into the motor housing through the conduit box to prevent movement of the conduit box relative to the motor housing.

10. The electric motor as recited in claim 9, wherein the threaded member prevents movement of the stator relative to the motor housing.

11. The electric motor as recited in claim 1, wherein the portion of the conduit box comprises a ductile metal.

12. The electric motor as recited in claim 11, wherein the ductile metal comprises steel.

13. The electric motor as recited in claim 1, wherein the portion comprises a flange portion disposed within the hollow interior to abut against an interior surface of the motor housing to prevent removal of the conduit box from the motor housing.

14. The electric motor as recited in claim 13, wherein the portion comprises a tubular portion forming a passageway through the hole in the motor housing into an interior portion of the conduit box.

15. The electric motor as recited in claim 1, wherein the motor housing comprises a motor frame, further wherein the hole through the motor housing extends through the motor frame.

16. The electric motor as recited in claim 1, wherein the motor frame is generally cylindrical.

17. The electric motor as recited in claim 16, wherein the conduit box has an arcuate bottom configured for placement against the motor frame.

18. An electric motor, comprising:
  a motor housing, comprising a smooth, arcuate exterior and a hollow interior, the motor housing having a hole therethrough between the exterior and the interior; and
  a conduit box comprising a ductile portion disposed through the hole, the ductile portion being coined against an interior surface of the motor housing.

19. The electric motor as recited in claim 18, wherein the hole in the motor frame is generally circular.

20. The electric motor as recited in claim 18, wherein the ductile portion forms a passageway between the hollow interior of the motor housing and an interior portion of the conduit box.

21. The electric motor as recited in claim 20, further comprising a stator disposed within the hollow interior of the motor housing, the stator comprising a plurality of stator windings.

22. The electric motor as recited in claim 21, further comprising electrical wiring coupled to the plurality of stator windings and routed through the passageway into an interior of the conduit box.

23. The electric motor as recited in claim 18, further comprising a screw threaded into the motor housing through the conduit box to prevent movement of the conduit box relative to the motor housing.

24. An electric motor, comprising:
  a motor housing having a hole therethrough; and
  a conduit box having a metallic securing member adapted to secure the conduit box to the motor housing, the metallic securing member comprising:
    a first portion adapted to extend through the hole in the motor housing; and
    a second portion flanged outward from the first portion.

25. The electric motor as recited in claim 24, wherein the metallic securing member is flanged outward from the first portion to prevent the second portion from being withdrawn through the hole.

26. The electric motor as recited in claim 24, wherein the hole has a first diameter and the second portion has a second diameter, the second diameter being greater than the first diameter.

27. The electric motor as recited in claim 24, wherein the conduit box comprises a box and a cover adapted to form a closed volume.

28. The electric motor as recited in claim 24, wherein the first portion has a passageway therethrough to enable a wire to pass through the hole in the motor housing.

29. The electric motor as recited in claim 24, wherein the motor housing has a curved surface adjacent to the hole and the conduit box has a corresponding curved surface adapted the placement adjacent against the curved surface adjacent to the hole.

30. An electric motor, comprising:
  a motor housing adapted to house a stator and having a hole therethrough; and
  a connector housing secured to the motor housing, comprising:
    a first portion adapted to house an electrical connection between a stator conductor disposed through the hole and an external power cable;
    a second portion extending from the housing portion into the hole in the motor housing; and
    a third portion extending radially from the second portion and being disposed within the motor housing, the third portion being wider than the hole.

31. The electric motor as recited in claim 30, wherein the second and third portions are adapted to form a tubular passageway through the hole in the motor housing.

32. The electric motor as recited in claim 30, wherein the third portion is flanged outward from the second portion.

33. The electric motor as recited in claim 30, wherein the third portion is circular.

34. The electric motor as recited in claim 30, wherein the third portion comprises a ductile metal.

* * * * *